United States Patent [19]

Proksa et al.

[11] 4,108,585

[45] Aug. 22, 1978

[54] APPARATUS FOR THE CONTINUOUS PRODUCTION OF FOAM PLASTIC BLOCKS OF RECTANGULAR CROSS-SECTION

[75] Inventors: Ferdinand Proksa, Leverkusen; Reiner Raffel, Siegburg; Ferdinand Althausen, Neunkirchen-Seelscheid, all of Germany

[73] Assignee: Maschinenfabrik Hennecke GmbH, Leverkusen, Germany

[21] Appl. No.: 699,419

[22] Filed: Jun. 24, 1976

[30] Foreign Application Priority Data

Dec. 20, 1975 [DE] Fed. Rep. of Germany ....... 2557572

[51] Int. Cl.² .............................................. B29D 27/04
[52] U.S. Cl. .............................. 425/89; 264/DIG. 84; 425/224; 425/817 C
[58] Field of Search ................... 425/115, 4 C, 817 C, 425/224, 329, 471, 89; 264/45.4, 48, 45.8, 51, 46.5, 52, 53, DIG. 84

[56] References Cited

U.S. PATENT DOCUMENTS

| | | | |
|---|---|---|---|
| 3,240,846 | 3/1966 | Voelker | 425/817 C X |
| 3,860,371 | 1/1975 | Willy | 425/817 C X |
| 3,942,925 | 3/1976 | Schmitzer et al. | 425/817 C X |
| 3,984,195 | 10/1976 | del Carpio | 425/817 C X |

*Primary Examiner*—Francis S. Husar
*Assistant Examiner*—Mark Rosenbaum
*Attorney, Agent, or Firm*—Gene Harsh; Joseph C. Gil; R. Brent Olson

[57] ABSTRACT

The instant invention relates to an apparatus for the continuous production of foam plastic blocks of a rectangular cross-section, in particular based on polyurethane. The apparatus generally comprises an endless conveyor belt whose upper run is provided with side walls, an unwinding device for a bottom and side sheet to cover the upper run of the belt and the side walls, a levelling device in the form of a roller or a doctor, which extends transversely in relation to the conveyor, a mixture application device and an unwinding device for a sheet to cover the mixture applied.

7 Claims, 3 Drawing Figures

APPARATUS FOR THE CONTINUOUS PRODUCTION OF FOAM PLASTIC BLOCKS OF RECTANGULAR CROSS-SECTION

BACKGROUND OF THE INVENTION

In the production of foam plastic blocks, the desired rectangular cross-section has been achieved by covering the foaming mixture with a sheet of paper or plastic material and avoiding the occurrence of a crown by applying the gentlest possible flattening pressure in the region of the expansion of the foam. However, it has been previously recognized that the surface of the foam plastic block, after the removal of the covering sheet, has large open and closed bubbles. Hitherto it had been thought that these cells were caused by the development of gas during the foaming reaction. For this reason attempts were made to utilize a porous or perforated covering sheet. A disadvantage of this arrangement, however, is that any levelling device used is contaminated in the region of foaming by the reaction mixture penetrating through the covering sheet. If a covering sheet with lower permeability is used, the penetration of the reaction mixture is avoided, but the gas located underneath the covering sheet cannot escape quickly enough through the covering sheet. A combination of two sheets has therefore been suggested, a gas-permeable sheet being covered with a liquid impermeable sheet to prevent the contamination of the levelling device. Naturally, this arrangement is of greater complexity.

An object of the present invention is therefore to solve the problem of the formation of bubbles on the surface of the foam plastic block.

DESCRIPTION OF THE INVENTION

According to the invention there is provided an apparatus for the continuous production of foam plastic blocks of rectangular cross-section, comprising an endless conveyor belt whose upper run is provided with side walls, an unwinding unit for supplying a bottom and side sheet for covering the upper run of the belt and the side walls thereof, a mixture application device for supplying foamable liquid to the said bottom sheet, a levelling device for effecting levelling of the said liquid before foaming commences, and an unwinding station for feeding a sheet to cover the mixture as it passes beneath the levelling device, the improvement wherein the gap between the sheet for covering the mixture and the bottom sheet at the position of the levelling device is less than the height of the layer of liquid upstream of the said gap, thereby causing a build-up of liquid immediately upstream of the gap, and wherein the angle between the sheet for covering the mixture and the layer of liquid upstream of said build-up is at least 60°.

One of the merits of the present invention is to have recognized that the formation of bubbles at the surface of the foam plastic block depends not so much on gas development during the foaming reaction, but rather on the air which is enclosed during the application of the covering sheet between this sheet and the surface of the mixture.

The effect of these limitations is that the covering sheet is fed in such a way that even if, as is sometimes the case, flapping of the covering sheet being fed occurs, such covering sheet is in continuous permanent contact with the surface of the reaction mixture, with the result that no wavelike irregular contact takes place which might cause entrapment of air.

The height of the levelling device above the surface of the upper run of the conveyor belt is preferably adjustable, so that the reaction mixture can be adjusted for blocks of differing layer thickness.

In a particular advantageous embodiment, the levelling device is supported in such a way as to be longitudinally movable within the area in which the applied reaction is still liquid. This permits the optimum adjustment of the levelling device to reaction mixtures reacting at differing speeds, without the necessity of varying production speed, i.e. the speed of advance of the conveyor belt.

The invention requires that the distance between the sheets in the gap must be compared with the height of the reaction mixture directly upstream of the gap. It is apparent that in practice the height of the gap between the levelling device and the surface of the upper run of the conveyor belt can be used. The thickness of the sheets will generally not affect the gap distance since the sheets generally only have a thickness of a few tenths of a millimeter, whereas the thickness of the applied mixture is, as a rule, several centimeters, for example 3 centimeters.

In a similar manner, the angle noted above can be measured from the feed direction of the covering sheet to the surface of the upper belt run, since normally the mixture layer in the liquid region has a substantially uniform thickness. Any deviations such as caused by the minimal foaming occuring before the foamable mixture contacts the levelling device would be so slight that they would certainly lie within the scope of the teaching of the instant invention.

In order to ensure that the height of the layer of the reaction mixture is greater immediately upstream of the gap than the height of the gap or the distance of the sheets in the gap from one another, the steps hereafter set forth can be taken.

When starting up the apparatus, it must be operated with an excess, so that a ridge builds up upstream of the gap. During continuous production, however, the quantity of mixture fed through the gap must be equal to that which is fed to it. Thus, the layer thickness of the mixture still upstream of the ridge will correspond to the layer thickness of the mixture between the two sheets in the gap. In addition, an accumulation of the mixture before the levelling device can also be achieved by having the upper run of the belt slightly inclined. In this case, the layer thickness of the reaction mixture increases from the point of application to immediately upstream of the gap. Furthermore, it is also possible to operate in such a way that the levelling device is arranged precisely at that point at which the foaming reaction is just beginning so that a buildup occurs. However, this method would be extremely unstable and very difficult to use in practice.

Levelling devices for use in apparatus for foam block production are already known. However, these known devices are not arranged in the region of the still liquid mixture, but only in that area in which the foaming stage takes place. These known devices are also not positioned to cause material to build up. For example, a known apparatus of this type is provided with a pressure guide, around which a covering sheet is guided. However, it is arranged so downstream in the foaming zone that a skin has already begun to form on the surface of the reaction mixture. The tension in this film causes an undesirable curvature which curvature must be compensated by pressure elements immediately adjoining the foaming zone.

In another known apparatus a levelling device consisting of a roller with a grating arranged downstream thereof is provided in the foaming zone. This causes the inclusion of air between the surface of the reaction mixture layer and the covering sheet applied, because the latter is fed to the surface of the mixture at a very acute angle.

Apparatus is already known for the production of sandwich panels in which levelling devices are provided. Embodiments of these devices can be used according to the invention. However, in the case of the instant invention, the object of the levelling device is to calibrate the relatively thin layer of the liquid reaction mixture over the width to the most accurate thickness possible in order to achieve a homogeneous sandwich core. The problem of air inclusion has not arisen with prior art devices, because relatively rigid layers are generally used as covering sheets, and these layers do not tend to flap during application. Thus it is clear that the routineer in the art could infer no incentive from this known state of the art to follow the teaching of the invention.

Various preferable embodiments of the apparatus according to the invention will hereafter be set forth.

In one particular embodiment, the angle noted above is more than 90°, since the greater the input angle, the lower the danger of flapping. In a further particular embodiment of the apparatus according to the invention, the build-up device consists of a roller whose diameter is not more than 20 cm. The principle here is that the smaller the diameter of the roller, i.e. the higher its crown, the more obtusely (more nearly vertically) the covering sheet is fed to the mixture layer, which forms a ridge upstream of the gap. If the level of the ridge is at the height of the rotational axis of the roller, the covering sheet runs into the mixture at right angles to the ridge. On the other hand, however, the ridge should not be so high as to cause over-rolling and uncontrollable residence times of the mixture.

If alternatively, a doctor blade is used as the build-up device then its upstream face should be at an angle of at least 60°, but preferably more than 90° to the surface of the mixture upstream thereof. The input edge should be slightly rounded to avoid the risk of the covering sheet breaking. The radius of curvature of the rounded edge should not be greater than 20 cm, and preferably much lower, approximately 1 to 3 cm.

Two embodiments of apparatus according to the invention are shown purely schematically in the accompanying drawing.

Figure 1:
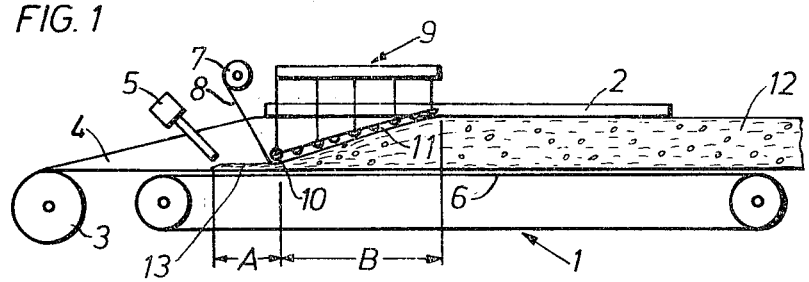
FIG. 1 shows a side view of the entire apparatus.

The apparatus shown in FIG. 1 comprises an endless conveyor belt 1, which is provided with side walls 2. An unwinding unit 3 for a bottom and side sheet 4 is arranged at the upstream end of the apparatus. A mixture application device 5, of a type known in the art, applies a liquid reaction mixture 13 of a polyol and an isocyanate to the bottom sheet 4, which is conveyed on the upper run 6 of the conveyor belt 1. A covering sheet 8 is unwound from the unwinding unit 7 and passes under a levelling device 9. This device comprises a roller (FIG. 2) or a doctor (FIG. 3) as a build-up device 10, which is arranged in that area A in which the reaction mixture is still liquid. A grating 11 is provided in the foaming zone B where the foam is expanding. This grating 11 is carried by the foam being produced and is of very light weight construction. The foam plastic block produced is designated with the numeral 12.

Figure 2:
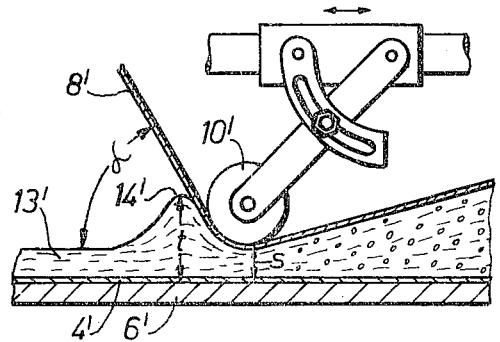
FIG. 2 shows part of an apparatus including a buildup device in the form of a roller.

In FIG. 2 the covering sheet 8' runs at an angle $\alpha$ of 60° to the surface of the layer of liquid reaction mixture 13'. The mixture 13' is located on the bottom and side sheet 4', which rests on the upper surface 6' of the conveyor belt. The roller 10' has a diameter of 8 cm. A gap $s$ of a height of 30 mm is formed between the roller 10' and the upper run 6' of the conveyor belt. Into this gap $s$ run the two sheets 4' and 8' having a thickness of 0.2 mm each. Compared to the gap $s$, their thickness is therefore negligible. Immediately upstream of the roller 10', the mixture layer 13' forms a ridge 14', whose height $t$ above the bottom sheet 4' is 35 mm. The layer thickness upstream of the ridge 14' is, as in the gap $s$, 30 mm. The dimensions $s$ and $t$ are for the sake of clarity shown neither in proportion nor to scale.

Figure 3:
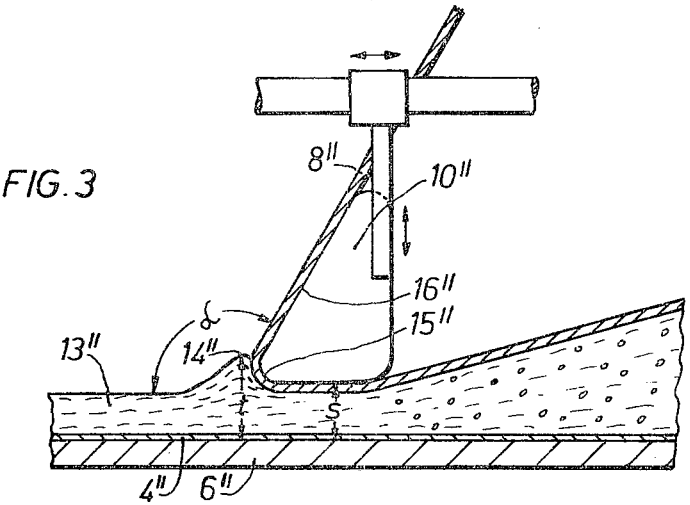
FIG. 3 shows part of an apparatus including a buildup device in the form of a doctor.

In FIG. 3, the covering sheet 8'' runs at an angle $\alpha$ of 120° to the surface of the layer 13'' of the liquid reaction mixture. The mixture layer 13'' is applied on the bottom and the side sheet 4'', which is conveyed by the upper run 6'' of the conveyor belt. The doctor 10'' has rounded front edge 15''. The inclination of the upstream face 16'' of the doctor defines the input angle $\alpha$ of 120°. The gap $s$ formed between the wiper 10'' and the upper run 6'' of the conveyor belt 1'' is 30 mm. The thickness of the sheets 4'' and 8'' is in each case 0.2 mm and is thus negligible. Immediately upstream of the gap $s$ the layer 13'' of the liquid reaction mixture, which is also 30 mm thick, forms a ridge 14'', whose height $t$ above the bottom and side sheets 4'' is approximately 35 mm.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

We claim:

1. In an apparatus for the continuous production of foam plastic blocks of rectangular cross-section comprising an endless conveyor belt whose upper run is provided with side walls, an unwinding unit adjacent said belt for supplying a bottom and side sheet for covering the upper run of the belt and the side walls, a mixture application device downstream of said unwinding unit for supplying foamable liquid to said bottom sheet, a levelling device downstream of said mixture application device for effecting levelling of the said liquid before foaming commences, and an unwinding station operatively associated with said mixture application device for feeding a sheet to cover the mixture as it passes beneath the levelling device, the improvement wherein said levelling device comprises a levelling means for providing a gap between the sheet for covering the mixture and the bottom sheet at the position of said levelling device and for causing a build-up of liquid immediately upstream of said gap, and wherein the angle between the sheet for covering the mixture and the upper run of the belt is at least 60°.

2. The apparatus of claim 1, wherein the height of the levelling device is adjustable.

3. The apparatus of claim 1, wherein the levelling device is mounted in such a way as to be longitudinally movable within the area in which the liquid supplied is still unfoamed.

4. The apparatus of claim 1, wherein the said angle is more than 90°.

5. The apparatus of claim 1, wherein the levelling device is a roller.

6. The apparatus of claim 5, wherein the diameter of the roller is not more than 20 cm.

7. The apparatus of claim 1, wherein the levelling device is a doctor.

* * * * *